United States Patent [19]
Horny et al.

[11] Patent Number: 5,294,348
[45] Date of Patent: Mar. 15, 1994

[54] PROCESS FOR REMOVING AMMONIA FROM WASTE WATERS

[75] Inventors: Patrick Horny, Navarrenx; Alain Ladousse, Pau, both of France

[73] Assignee: Societe Nationale Elf Aquitaine, Courbevoie, France

[21] Appl. No.: 915,816

[22] PCT Filed: Nov. 25, 1991

[86] PCT No.: PCT/FR91/00932
§ 371 Date: Jul. 22, 1992
§ 102(e) Date: Jul. 22, 1992

[87] PCT Pub. No.: WO92/09531
PCT Pub. Date: Jun. 11, 1992

[30] Foreign Application Priority Data

Nov. 26, 1990 [FR] France ................ 90 14748

[51] Int. Cl.$^5$ ............ C02F 1/58; C02F 1/66
[52] U.S. Cl. ................. 210/724; 210/706; 210/903; 210/906; 423/306
[58] Field of Search .......... 210/903, 723, 724, 726, 210/906; 423/306, 162

[56] References Cited

FOREIGN PATENT DOCUMENTS

| | | |
|---|---|---|
| 0335280 | 10/1989 | European Pat. Off. |
| 3732896 | 8/1988 | Fed. Rep. of Germany. |
| 3830332 | 3/1990 | Fed. Rep. of Germany ...... 210/903 |
| 3833039 | 4/1990 | Fed. Rep. of Germany. |
| 88700 | 8/1978 | Japan ................ 210/903 |
| 19551 | 2/1979 | Japan ................ 210/903 |
| 121560 | 9/1979 | Japan ................ 210/903 |
| 127148 | 10/1979 | Japan ................ 210/903 |
| 157387 | 12/1980 | Japan ................ 210/903 |
| 214396 | 9/1988 | Japan ................ 210/903 |
| WO12029 | 12/1989 | PCT Int'l Appl. ........ 210/903 |

*Primary Examiner*—Neil M. McCarthy
*Attorney, Agent, or Firm*—Oblon, Spivak, McClelland, Maier & Neustadt

[57] ABSTRACT

A method for removing ammonia, or ammonia and phosphates from industrial agricultural or household effluents by causing precipitation as magnesium ammonium phosphate by means of a liquid reagent containing magnesium and phosphate ions and an acid. The effluents have more than 1 gle of ammoniacal nitrogen and the pH is adjusted to between 9 and 11 after addition of the liquid reagent.

15 Claims, No Drawings

PROCESS FOR REMOVING AMMONIA FROM WASTE WATERS

The invention relates to a process for removing ammonia from waste waters.

The removal of ammonia from waste waters is generally carried out by a biological treatment. Waters heavily laden with ammonia, containing more than one gram of ammonia per litre, are lethal to living organisms. In order to carry out the biological treatment of these waters, it is necessary to modify the process and to add nitrification and denitrification stages, which leads to high additional costs.

There are also physical processes for removing ammonia.

The stripping of ammonia with air or with steam requires major investment, which can only be borne by large plants.

Ion exchange is only conceivable for low concentrations. In fact, because of difficulties in treating the regeneration eluates, the problem is simply shifted.

Membrane techniques, such as electrodialysis, give goods results but still leave many questions unresolved, concerning the service life of the membranes, blockages, etc. The cost of these techniques is also high.

German Patent Application DE-A-3,732,896 describes a chemical process based on the formation, by successive addition of a phosphate and then of magnesia to waste waters, of a salt, magnesium ammonium phosphate, which is slightly soluble in aqueous media. This process does not allow the complete removal of the ammonia contained in the waste waters. With the aim of improving this process, and thus of increasing the degree of removal of the ammonia, European Patent Application EP-A-335,280, by the same inventor, proposes a three-stage process. This process consists in inserting an acid treatment between the phosphate addition and magnesia addition stages. This three-stage process is more complex and thus costly, and requires the handling of two solid reactants.

We have now found a process for removing ammonia in a single stage, using a single reactant.

One great advantage of this process is the use of a liquid reactant which is easy to handle and to measure.

Another advantage of this process is a degree of removal of ammonia which is markedly superior to that of the prior art.

An advantageous possibility is to follow the process according to the invention with a biological treatment, made possible by the reduction in the ammonia content of the treated waste waters.

Finally, it is very important to note that the process allows ammonia and phosphates to be removed from waste waters simultaneously.

The process according to the invention for removing ammoniacal nitrogen contained in waste waters consists in the precipitation of the ammoniacal nitrogen in the form of a magnesium ammonium phosphate, characterised by the addition to the waste waters of a single liquid reactant containing sources of magnesium ions, phosphate ions and an acid.

The magnesium ammonium phosphate corresponds to the formula $NH_4MgPO_4$. It generally crystallises in the hexahydrated form. This salt is very sparingly soluble in water and it is even used in analytical chemistry for the determination of magnesium or of phosphoric acid.

The single liquid reactant preferably contains equimolar quantities of phosphate and magnesium ions. This corresponds to the stoichiometry of magnesium ammonium phosphate. The phosphate/magnesium ratio can however vary between approximately 0.5 and 1.5.

If the waste waters also contain phosphate ions in addition to ammonia, this is taken into account in the formulation of the reactant in order to obtain the desired stoichiometry.

The reactant generally contains approximately 0.8 to 2 moles of magnesium ions and of phosphates per mole of ammonium ion. An excess of magnesium and of phosphate ion in relation to the ammonium ions is generally used.

In general, an excess of 1.1 to 1.5 moles of magnesium ions and of phosphates per mole of ammonium ions is sufficient.

The source of magnesium ions is generally magnesium oxide or magnesia, $MgO$. It is, however, possible to use magnesium salts, such as the chloride or the sulphate.

The source of phosphate ions is generally phosphoric acid, $H_3PO_4$, but alkali metal or alkaline-earth metal phosphates are equally suitable.

The acids are strong inorganic or organic acids, such as hydrochloric acid, sulphuric acid, formic acid or acetic acid. Hydrochloric acid is preferably used. The quantity of acid necessary to obtain a pH of between approximately 1 and 2 is used.

The single liquid reactant is prepared by simply mixing the sources of magnesium ions and of phosphate, the strong acid and, optionally, water.

The ammoniacal nitrogen content of the waste waters is determined by chemical or physical measuring and the reactant containing between 0.8 and 2 moles, and preferably between 1.1 and 1.5 moles, of magnesium ions and of phosphates in relation to the ammoniacal nitrogen content is then introduced.

With an excess of reactants of approximately 50%, the magnesium ammonium phosphate precipitates virtually quantitatively. By adding the same excess of magnesium ions and of phosphates, but separately, in two stages, only 90 % of the nitrogen contained in the waters is removed.

After addition of the single reactant, the pH of the medium is adjusted with a base. The pH must be greater than 7, preferably greater than 9. It is advantageously between 9 and 11.

In order to adjust the pH, an inorganic base, such as sodium hydroxide, potassium hydroxide or mixtures thereof, is used. It is also possible to use bases recovered from industrial operations, such as waters containing soda, without prior purification.

Since the salt formation is exothermic, it is pointless to heat the medium. The salt precipitates instantaneously. It is separated from the waste waters by a physical process, such as filtration, centrifuging or settling.

The process can operate either continuously or non-continuously. In the case of continuous operation, the nitrogen analyser, which continuously measures the nitrogen content of the waste waters, directly actuates an inlet microvalve for the single reactant. The pH is adjusted in the reactor by addition of a base and the salt is then separated, preferably by settling.

The process according to the invention allows the treatment of all waste waters containing nitrogen in the form of ammonium ions. It is particularly suited to the treatment of waste waters containing more than 1 g/l of nitrogen in the ammoniacal form and to the treatment of waters containing ammonium ions and phosphate ions.

The waste waters may be of industrial, agricultural or domestic origin.

Waste waters heavily laden with ammonia, of industrial origin, originate from industries which use animal or plant materials as well as from chemical industries which handle nitrogenous products. These include the primary agro-foodstuffs industries such as pectin or gelatin factories or slaughterhouses. Among the chemical industries, fertiliser manufacture may be mentioned.

Agricultural waste waters arise from the animal rearing sector, pig slurry manure liquids being the best known example.

The following examples illustrate the invention without, however, limiting it.

EXAMPLE 1

A solution of ammonium chloride in water is prepared, which contains 1 g/l of nitrogen in the form of ammonium ions.

The reactant is prepared from 30 g of water, 8.2 g of phosphoric acid, 3 g of magnesia and 8.2 g of hydrochloric acid. 50 g of a reactant is thus obtained which contains 75 mmol of magnesium and 75 mmol of phosphate.

This reactant is added to the ammonium chloride solution and the pH is adjusted to 10 with sodium hydroxide solution.

Table 1 summarises the purification yields as a function of the excess of the reactant employed.

EXAMPLE 2 (Comparative)

A solution of ammonium chloride in water is prepared, which contains 1 g/l of nitrogen and is identical to Example 1. Variable quantities of dipotassium phosphate are added, followed by equimolecular quantities of magnesium sulphate. The pH is adjusted to 9.9 with sodium hydroxide solution.

Table 1 summarises the purification yields as a function of the excess of the reactant employed.

EXAMPLE 3

To an aqueous ammonium chloride solution, identical to Examples 1 and 2, is added a single reactant, containing 40 g of water, 18 g of dipotassium phosphate, 13 g of magnesium sulphate and 4 g of hydrochloric acid. A reactant containing 75 mmol of magnesium and 75 mmol of phosphate is thus obtained. This reactant is added to the ammoniacal solution and the pH is adjusted to 9.9 with sodium hydroxide solution.

Table 1 summarises the purification yields as a function of the excess of the reactant employed.

TABLE 1

| Molar excess | Purification yield % Example 1 | Purification yield % Example 2 (Comparative) | Purification yield % Example 3 |
| --- | --- | --- | --- |
| 0% | 76 | 58 | 80 |
| 10% | 85 | 66 | 82 |
| 25% | 92 | 76 | 88 |
| 50% | >99 | 92 | 92 |

A reactant containing 75 mmol of magnesium and 75 mmol of phosphate is thus obtained.

EXAMPLE 4

The procedure of Comparative Example 2 is used with a water sample, originating from the combustion condensates of a meat cooker, which contains 1.8 g/l of nitrogen in ammoniacal form.

With an 80% excess of dipotassium phosphate and of magnesium sulphate, the yield of the purification is 91%.

EXAMPLE 5

The procedure of Example 1 is used on a water sample arising from aerocondensers, which contains 556 ppm of nitrogen in the ammoniacal form per litre.

With a 30% excess of reactant, the purification yield is 96%.

We claim:

1. A process for removing ammoniacal nitrogen contained in waste waters having more than 1 g/l of nitrogen in the ammoniacal form by precipitation in the form of a magnesium ammonium phosphate, comprising the addition to the waste waters of a single liquid reactant containing sources of magnesium ions, phosphate ions and an acid, and then adjusting the pH to a value of between 9 and 11.

2. The process according to claim 1, wherein the ratio of the phosphate/magnesium ions of the reactant is from 0.5 to 1.5.

3. The process according to claim 2, wherein the ratio of the phosphate/magnesium ions is 1/1.

4. The process according to claim 3, wherein the reactant contains between 0.8 and 2 moles of magnesium and of phosphate per mole of ammoniacal nitrogen in the waste waters.

5. The process according to claim 1, wherein the source of magnesium ions is selected from the group consisting of magnesium oxide, magnesium sulphate, or magnesium chloride.

6. The process according to claim 1, wherein the source of phosphate ions is selected from the group consisting of phosphoric acid, alkali metal phosphates, and alkaline-earth metal phosphates.

7. The process according to claim 1, wherein the acid is selected from the group consisting of hydrochloric acid, sulphuric acid, formic acid, and acetic acid.

8. The process according to claim 1, wherein the quantity of acid is that necessary to obtain a pH of between 1 and 2.

9. The process according to claim 1, wherein the pH is adjusted with potassium hydroxide solution, sodium hydroxide solution or mixtures thereof.

10. The process according to claim 1, wherein the pH is adjusted with bases recovered from industrial operations, without prior purification.

11. The process according to claim 1, wherein the waste waters also contain phosphate ions.

12. The process according to claim 1, wherein the waste waters are of industrial, agricultural or domestic origin.

13. The process according to claim 4, wherein the reactant contains between 1.1 and 1.5 moles of magnesium and phosphate per mole of ammonia and nitrogen.

14. The process according to claim 5, wherein the source of magnesium ions is magnesium oxide.

15. A process for treating waste waters including the addition to waste waters containing more than 1 g/l of ammoniacal nitrogen, and phosphate, of a single liquid reactant comprising magnesium ions, phosphate ions, and an acid, and then adjusting the pH of the waste waters to a value of between 9 and 11.

* * * * *